US012791071B2

(12) United States Patent
Krulak et al.

(10) Patent No.: US 12,791,071 B2
(45) Date of Patent: Nov. 10, 2026

(54) CRUSHABLE BODY FOR POSITION ADJUSTMENT

(71) Applicant: Goodrich Corporation, Charlotte, NC (US)

(72) Inventors: Maciej Wojciech Krulak, Warsaw (PL); Kamil Mateusz Babicki, Paczkow (PL); Kazimierz Daniel Kwiatkowski, Ciechocinek (PL); Artur Robert Luber, Scinawka Gorna (PL); Krzysztof Wojciech Zmudzin, Wilczyce (PL)

(73) Assignee: GOODRICH CORPORATION, Charlotte, NC (US)

( * ) Notice: Subject to any disclaimer, the term of this patent is extended or adjusted under 35 U.S.C. 154(b) by 491 days.

(21) Appl. No.: 17/977,124

(22) Filed: Oct. 31, 2022

(65) Prior Publication Data

US 2023/0147861 A1 May 11, 2023

(30) Foreign Application Priority Data

Nov. 11, 2021 (EP) .................................... 21461618

(51) Int. Cl.
*F16D 65/54* (2006.01)
*B64C 25/42* (2006.01)
(Continued)

(52) U.S. Cl.
CPC ............ *F16D 65/543* (2013.01); *B64C 25/42* (2013.01); *F16D 65/18* (2013.01); *F16D 2125/06* (2013.01); *F16D 2250/0084* (2013.01)

(58) Field of Classification Search
CPC .................. F16D 65/543; F16D 65/18; F16D 2250/0084; F16D 2125/06; B64C 25/42
See application file for complete search history.

(56) References Cited

U.S. PATENT DOCUMENTS 3,370,118 A * 2/1968 Lowe ..................... B29C 53/30 264/296
3,403,754 A * 10/1968 Barrett ................. F16D 65/543 188/196 P
(Continued)

FOREIGN PATENT DOCUMENTS

EP 3734104 11/2020

OTHER PUBLICATIONS

EPO, Extended European Search Report dated Apr. 20, 2022 in EP Serial No. 21461618.7.
(Continued)

*Primary Examiner* — Vishal R Sahni
(74) *Attorney, Agent, or Firm* — SNELL & WILMER L.L.P.

(57) ABSTRACT

The present application relates to crushable body in the form of a corrugated thin walled tube e.g. for use in a piston assembly for engaging two selectively engageable parts. The piston assembly has a housing defining a piston cylinder and a piston. The assembly also has a piston stroke limiter. The piston stroke limiter is configured to limit the length of a return stroke of the piston from an extended stroke position and a retracted stroke position. A crushable body in the form of a corrugated thin walled tube acts between the piston and the piston stroke limiter and is arranged to reduce in axial length when a length of an extended stroke exceeds a length of a retraction stroke to maintain the length of the return stroke.

12 Claims, 6 Drawing Sheets

(51) Int. Cl.
*F16D 65/18* (2006.01)
*F16D 125/06* (2012.01)

(56) References Cited

U.S. PATENT DOCUMENTS

| | | | | |
|---|---|---|---|---|
| 3,851,567 | A | 12/1974 | Thompson | |
| 3,903,999 | A * | 9/1975 | Ditlinger | F16D 65/543<br>188/196 R |
| 4,006,669 | A | 2/1977 | Price | |
| 4,529,068 | A | 7/1985 | Gallo | |
| 5,219,046 | A * | 6/1993 | Clark | F16D 65/54<br>188/196 R |
| 5,542,504 | A | 8/1996 | Berwanger | |
| 6,016,892 | A * | 1/2000 | Berwanger | F16D 65/18<br>188/73.1 |
| 2020/0347900 | A1 * | 11/2020 | Campbell | F16D 55/40 |

OTHER PUBLICATIONS

European Patent Office, European Office Action dated May 20, 2025 in Application No. 21461618.7.

* cited by examiner

Corrugated Tube

Straight Tube

CRUSHABLE BODY FOR POSITION ADJUSTMENT

CROSS-REFERENCE TO RELATED APPLICATIONS

This application claims priority to, and the benefit of, EP Patent Application No. 21461618.7, filed Nov. 11, 2022 and titled "CRUSHABLE BODY FOR POSITION ADJUSTMENT," which is incorporated by reference herein in its entirety for all purposes

FIELD

The following description relates to a crushable body used in a position adjustment assembly for example in a piston assembly with an adjuster assembly. The following description also relates to a piston assembly, an adjuster assembly, a cartridge for an adjuster assembly, a brake system, and a method of assembling a piston assembly.

BACKGROUND

Assemblies are known in various fields where a position of a moveable member needs to be adjusted due to changes in operation conditions or requirements and where the position adjustment is provided using a crushable body that, in certain operating conditions, is crushed to a shorter axial length which determines the position of the moveable member. One example of the use of such adjustment assemblies is in a brake system. Brake systems typically include friction elements that are brought into engagement with each other when a braking action is required to cause braking. The friction elements, which are typically friction discs, are selectively engaged and disengaged by use of one or more pistons. Such braking systems are known in many applications e.g. in machinery and also in vehicles and aircraft. Such multi-disc braking systems include a plurality of friction discs, also known as a heat sink, which are collectively operated to brake a rotating body such as a wheel e.g. a wheel on the landing gear of an aircraft.

During a braking action, wear of the surfaces of friction elements may occur over time. Such wear of the friction discs or other elements causes an increased clearance between friction surfaces of the friction elements when the brake system is disengaged. This increased clearance results in a longer stroke length of a piston or pistons required to engage the brake system, and therefore a longer engagement time.

To compensate for the increased clearance periodic manual adjustment of the brake system may be undertaken. Automatic adjusters are also known. One such mechanical automatic adjuster utilizes a tube on the piston and a tube expander element on a rod extending from the housing and through a head of the piston to be received in the tube. As the stroke length of the piston increases, the tube expander element attached to the housing is drawn axially along the bore of the tube and radially outwardly expands the tube to establish a new retracted position for the piston. Such adjuster assemblies may also be found in other applications. Another solution is to use a crushable tube to adjust the stroke length as the brake components wear. The tube is made of a material that crushes under force, but does not return to its original length when the force is removed. Such tubes, however, have been found to have an irregular radial inner and outer diameter when crushed. This irregular shape can result in the crushed tube interfering with other parts of the overall system where the assembly is used e.g., in a brake system, the spring guide and the piston. The forces generated by the crushed tube when in such an irregular crushed shape may also be irregular.

SUMMARY

According to an aspect of the disclosure, there is provided a crushable body for use in a position adjustment assembly, the crushable body comprising a thin-walled tube comprising a corrugated crushable body portion between two flat end portions, the corrugated crushable body portion configured to form a crushed body of reduced axial length compared to the axial length of the tube when a predetermined force is applied to the tube. In a particular aspect, there is provided a piston assembly comprising a housing defining a piston cylinder; a piston axially moveable within the cylinder responsive to a force applied to an end of the piston; and an adjuster assembly including a piston stroke limiter configured to limit the length of a return stroke of the piston from an extended stroke position, with respect to the cylinder, and a retracted stroke position, with respect to the cylinder; and a crushable body acting between the piston and the piston stroke limiter, the crushable body comprising a corrugated thin walled sleeve extending coaxially with the piston and being arranged to reduce in axial length when a length of an extension stroke exceeds a length of a retraction stroke to set the axial position of the piston stroke limiter to maintain the length of the return stroke.

The crushable body may be between the piston and the piston stroke limiter.

The crushable body may be a sleeve surrounding at least part of the piston.

The crushable body may be in the piston cylinder.

Expansion of the crushable body in a radial direction may be constrained by the piston. Expansion of the crushable body in a radial direction may be constrained by the housing.

The crushable body may be arranged to progressively deform over a plurality of stroke cycles of the piston.

The piston assembly may comprise an extension stroke stop and a retraction stroke stop, wherein the piston stroke limiter comprises a limiting member movable in an axial direction between the extension stroke stop and the retraction stroke stop.

The extension stroke stop and the retraction stroke stop may be formed by the housing.

The piston may extend through the crushable body

The piston assembly may comprise a retraction biasing member arranged to bias the piston stroke limiter from an extended position to a retracted position.

The retraction biasing member may be a helical compression spring.

According to an aspect of the disclosure, there is provided an adjuster assembly for maintaining a release clearance between selectively engageable friction parts to compensate for wear in the frictional parts, the assembly comprising a stroke limiter configured to limit the length of a stroke of an extendable member between an extended stroke position and a retracted stroke position; and a crushable body comprising a corrugated thin walled tube arranged to act between the piston and the piston stroke limiter and configured to be at least partially crushed to reduce the axial length of the crushable body in response to an extension stroke movement due to wear of the frictional parts exceeding a retraction stroke movement.

According to an aspect of the disclosure, there is provided a cartridge for an adjuster assembly of a piston assembly comprising a crushable body in the form of a corrugated thin walled tube arranged to reduce in axial length when compressed in an axial direction.

According to an aspect of the disclosure, there is provided a piston assembly comprising a cartridge for an adjuster assembly with a crushable body in the form of a corrugated thin walled tube arranged to reduce in axial length when compressed in an axial direction According to an aspect of the disclosure, there is provided a brake system for an aircraft comprising at least one of a piston assembly as recited above, an adjuster assembly as recited above, and a cartridge as recited above.

According to an aspect of the disclosure, there is provided a method of assembling a piston assembly comprising: receiving a piston in a piston cylinder of a housing through a first side of the housing in a first direction; receiving an adjuster assembly comprising a crushable body in the form of a corrugated thin walled tube on the piston in the first direction; and enclosing the piston cylinder at the first side.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings. The description relates to the use of the crushable body of the disclosure in an adjuster of a brake system. The crushable body may, however, have many other applications.

DETAILED DESCRIPTION

Figure 1:
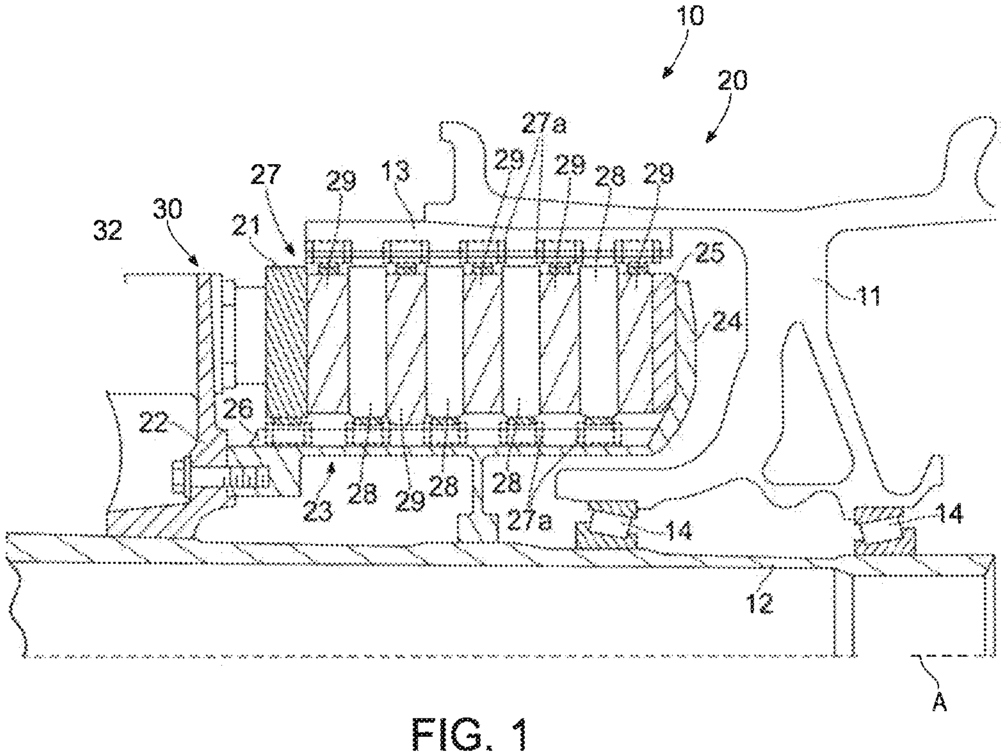
FIG. 1 is a schematic side view of a multi disc brake system.

With reference to FIG. 1, a brake system 10 is described below. The brake system 10 is a multi-disc brake system. The brake system 10 comprises a friction brake assembly 20 and piston assemblies 30. One of a plurality of piston assemblies 30 is shown, and the number of piston assemblies 30 may differ and may be a single piston assembly 30. The piston assembly 30 is arranged to act on the brake assembly 20 to actuate a braking action.

The brake system 10 is operable to restrict rotation of a rotating body such as a wheel. In the example shown, the rotating body is an aircraft wheel 11, but the brake system of this disclosure may have other applications. The wheel 11 includes a series of axially extending rotor splines 13 (one shown). Wheel 11 is supported for rotation about an axle 12 by bearings 14. Axle 12 defines an axis A of the brake system 10 and of various components thereof. Reference to the terms axis and axial may include an axis of rotation defined by axle 12 or a dimension parallel to such axis.

The brake assembly 20 includes pressure plate 21, flange 22, torque tube 23, and end plate 24. Torque tube 23 may be an elongated annular structure that includes a reaction plate 25 and a series of axially extending stator splines 26 (one shown). The brake assembly 20 also includes a plurality of friction disks 27. These comprise at least one non-rotatable friction disk (stator) 28, and at least one rotatable friction disk (rotor) 29. The friction disks 27 each include an attachment structure 27*a*.

The flange 22 is fixedly mounted to the axle 12. The pressure plate 21 is also non-rotatable. The piston assemblies 30 are connected to the flange 22 at circumferentially spaced positions around the flange 22. The piston assemblies 30 face axially toward the wheel 10 and contact a side of pressure plate 21. The piston assemblies 30 are hydraulically powered, however they may be powered mechanically, electrically, or pneumatically. The piston assemblies 30 are configured to exert a force on the friction disks 27 towards reaction plate 25. Actuation of the piston assemblies 30 causes the rotors 29 and stators 28 to be pressed together between the pressure plate 21 and the end plate 24. Although the piston assemblies 20 are shown as part of brake system 10, it is contemplated that the piston assemblies, as disclosed herein, may be employed in a variety of other systems. For example, piston assemblies 30 may be employed in a multi-disk clutch system.

One of the piston assemblies 30 is described in further detail below with reference to FIG. 2. The piston assembly 30 includes a piston 31. The piston 31 is configured to translate axially within a piston housing 32. The piston assembly comprises an adjuster assembly 50 located axially around the piston between the piston and the housing. The piston 31 moves axially within and relative to the adjustor assembly 50.

The piston housing 32 includes a main housing body 33 and a locker 34. The locker 34 is secured to an open end of the housing 32 to close the end.

The housing 32 defines a piston cylinder and defines an axis B of the piston assembly 30. The piston 31 is translatable in a longitudinal direction along axis B in the piston cylinder.

The piston 31 has a piston head 36 and a piston rod 37. The piston rod 37 extends from the piston head 36. The piston rod 37 is elongate and extends from the housing 32. A distal end 38 of the piston rod 37 is attached to a disc 39, also known as an insulator, by means of an insulator support 40 on the distal end 38 of the piston rod 37. The disc 39 is secured to the end of the distal end 38 by the insulator support 40 and moves together with the piston rod 37. The insulator is connected to the insulator support by a fastener such as a clip. The disc 39 comprises an engaging surface 39*a*. The engaging surface 39*a* is arranged to move into and out of engagement with the friction brake assembly 20. The engaging surface 39*a* of the disc 39 is arranged to contact and bias pressure plate 21 when moved into engagement in dependence on operation of piston assembly 30.

As is known in the art, movement of the piston relative to the housing is caused by application of a brake or working fluid, for example hydraulic fluid, to the piston head 36. A fluid supply (not shown) is arranged to supply working fluid to the volume.

A seal 41 extends around the piston head 36. The seal 41 is a slidable seal which is configured to slide along and seal with the interior wall of the housing 32. The seal 41 is shown in the example as comprising an o-ring, however alternative sealing arrangements may be provided. The arrangement of the piston 31 and the adjuster assembly 50 with the housing 32 mean that a single sealing arrangement provided by seal 41 is required to fluidly seal between the adjuster assembly 50 and the cavity (not shown) where the pressurized fluid is applied to the piston head. As such, a simple sealing configuration of the piston assembly 30 is provided. Working fluid in the cavity is prevented from flowing to other parts of the assembly by the seal 41.

The piston assembly 30 includes the adjustor assembly 50. The adjustor assembly 50 is received in the housing 32. The adjuster assembly 50 extends in an axial direction. The adjuster assembly 50 includes a spring 52, a spring guide 53, a crushable body 60 and a piston stroke limiter 70 defined at the end of the spring guide. The spring 52 is a biasing member which is arranged to bias the piston 31 into a retracted stroke position, for example as shown in FIG. 2. The retracted stroke position is a position in which the piston 31 has moved in a retracted position into the piston chamber.

The spring 52 is a compressive helical spring. The housing 32 defines an annular chamber 54 around the piston that extends in a longitudinal direction about axis B. The annular chamber 54 is accessible at the open end of the housing when the locker 34 is removed. The spring 52 is received in the annular chamber 53 and is retain by the spring guide 53.

The crushable body 60 will now be described in detail with reference to FIGS. 2 to 6. The crushable body 60 comprises a corrugated thin walled sleeve structure 61 and is received in the annular chamber around the spring 52 and the spring guide 53, between the spring guide and the housing. Crushable body 60 forms a sleeve through which the piston 31 extends. Crushable body 60 is an elongate corrugated tube 61 in which corrugations 64 are formed around the tube along the length of the tube. In an uncrushed condition the crushable body 60 defines a gap between the tube and the housing. This provides for radial expansion of the crushable body 60 when the crushable body is at least partially in a crushed condition.

The crushable body 60 extends in an axial direction in the housing 32. The crushable body 60 has a first end 62 and a second end 63. The thin walled tube 61 is collapsible in an axial direction when the crushable body 60 is compressed in the axial direction between the first and second ends 62, 63. The crushable body 60 defines a tubular arrangement through which the piston rod 37 is extendible.

The term thin walled is used herein to describe elements that have a small thickness in comparison to other dimensions such as length and width. Such elements are deformable in a controlled manner when a compressive force is applied to opposing, distal ends of the element. It will be understood that the thickness of the wall will be dependent on the compressive force required to crush the body 60 as well as the dimensions of the corrugations. In the present arrangement, it is anticipated that the thickness of the walls of the crushable member is in the range of approximately 0.1 mm-0.5 mm (0.004-0.02 inch). The walls may be a sheet material, with a thickness of less than approximately 6 mm (0.24 inch). Other dimensions are also possible provided the crushing performance is such as to maintain a substantially regular shape. It will also be understood that the material of the crushable body 60 may differ, in the present arrangement the crushable body 60 is formed from a ductile metal sheet arrangement, such as stainless steel, for example. Other materials include plastics, composites and foam.

A crushable body is intended to mean a body which is able to reduce in axial length when a compressive force is applied to the crushable body in the axial direction. Upon application of a compressive force in the axial direction above a predetermined value, the body reduces in axial length in a controlled manner, but does not collapse. Such an arrangement is non-resilient, that is, upon release of or reduction of the compressive force on the crushable body, the body 60 does not substantially expand in axial length. The predetermined force that causes crushing is largely independent of the deformed shape of the crushable tube—i.e. its shape at any stage of crushing, and is, therefore as independent of the number of times the axial length has previously been adjusted. It is also desirable that this force value is independent of temperature to avoid loss of adjustment force at high temperatures or to avoid variations in adjustment force due to different temperatures.

The crushable body 60 and the spring guide 53 defining the piston stroke limiter 70 are housed in the housing 32.

The piston stroke limiter 70 transfers the force applied by the piston and the spring 52 between the components.

The limiting member 72 is received in the housing between a retraction stroke stop 76 and an extension stroke stop 77. The retraction and extension stroke stops 76, 77 limit the axial movement of the piston stroke limiter 70. The retraction stroke stop 76 and the extension stroke stop 77 are spaced apart from each other in the axial direction. The spacing, together with the thickness of the spring guide 53 defines the stroke length of the piston stroke limiter 70. It will be understood that the configuration of the stoke stops 76, 77 may differ.

Figure 2:
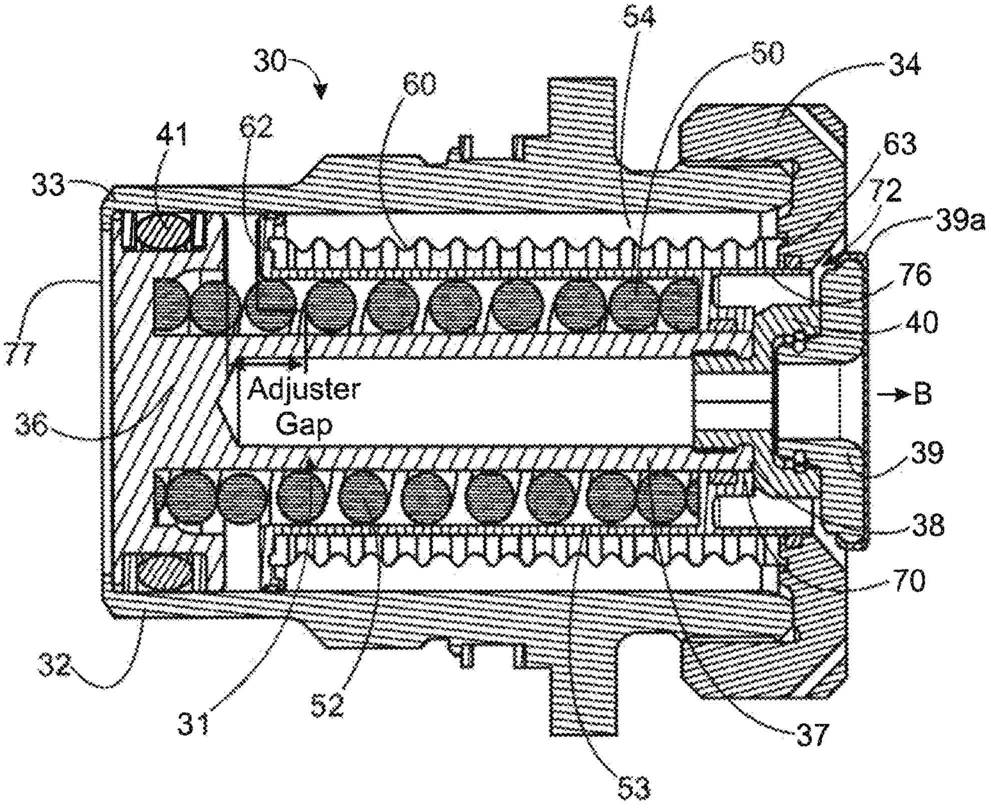
FIG. 2 is a cross-sectional schematic side view of a piston assembly of the multi disc brake system incorporating an adjustor assembly having a crushable body according to the disclosure, in the neutral position.

In a neutral condition, as shown in FIG. 2, in which the hydraulic pressure applied to the piston assembly 30 is less than the force exerted by the spring 52, the piston 31 is biased into the retraction position. The retraction position is limited by retraction stroke stop 76.

In use, the piston assembly 30 is assembled with the friction brake assembly 20. The disc 39 is disposed adjacent to but spaced from the pressure plate 21 as shown in FIG. 2. A gap defining a release clearance is defined between the engaging surface 39*a* and the pressure plate 21. Such a release clearance is predetermined.

Figure 2A:
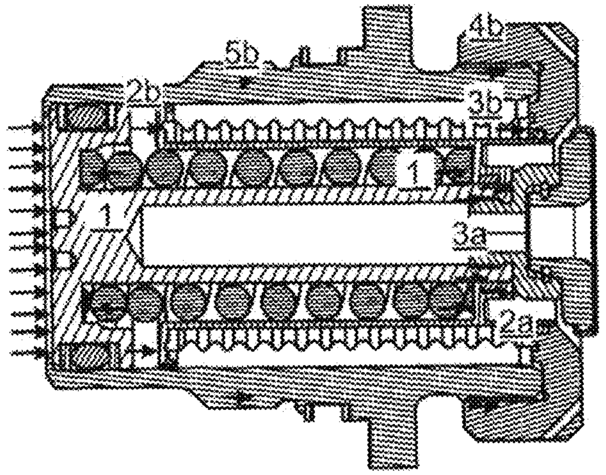
FIG. 2A shows the forces acting when the assembly is in the state shown in FIG. 2.

Operation of the piston assembly 30 will now be described briefly. The piston 31 is initially in its neutral position, as shown in FIGS. 1 and 2, with the piston 31 in the retracted stroke position and the predetermined release clearance being formed between the disc 39 and the pressure plate 21. The disc 39 and pressure plate 21 act as selectively engageable parts. Components of the brake assembly 20 act as selectively engageable parts in dependence of the action of the piston assembly 30. The spring 52 biases the piston 21 into the retracted stroke position by means of the piston stroke limiter 70 and crushable body 60 through which the biasing force acts. The acting forces are indicated by arrows. Here, the load from the pre-loaded spring 52 acts on the piston 31 on one side and on the spring guide 53 on the other side (1, FIG. 2A). The load of the spring acting on the spring guide loads (2*a*, FIG. 2A) the insulator support 40 which is threaded to the piston 31 and so the load is transferred (3*a*, FIG. 2A) through the thread to the piston. In this state, pressure applied to the end of the piston is not enough to compress the spring 52. Until the spring force is exceeded, pressure applied to the end of the piston by the compressed fluid is transferred through the spring 52 to the spring guide 53 (1, FIG. 2A) and from the spring guide to the corrugated crushable tube 60 (2*b*, FIG. 2A). The force acting on the crushable tube is passed to the locker 34 (3*b*, FIG. 2A) and then to the housing through the threaded connection (4*b*, FIG. 2A). The insulator is not loaded in this state.

Figure 3:
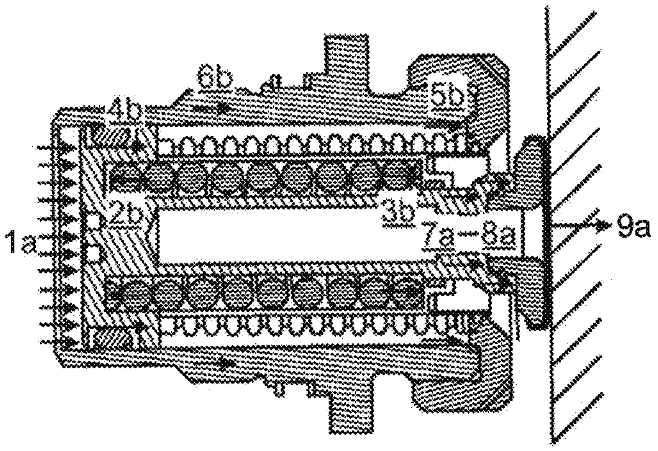
FIG. 3 is a cross-sectional schematic side view of a piston assembly of the multi disc brake system incorporating an adjustor assembly having a crushable body according to the disclosure, in the braking position.
Figure 4:
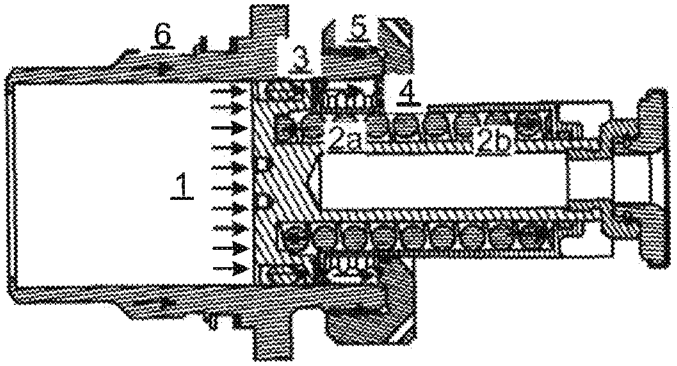
FIG. 4 show the forces acting to retain the piston when it is full extended.

Upon actuation of the piston assembly 30 (FIG. 3) a hydraulic force is applied to the piston head 36 through supply of pressurized fluid to the piston head (1*a*, FIG. 3). The piston 31 is urged to move and so translate along in an axial direction from the retracted stroke position to an extended stroke position. The piston 31 translates in the axial direction until the engaging surface 39*a* of disc 39 engages with the pressure plate 21 and causes actuation of the friction brake assembly 20. The force required to crush the crushable structure is greater than the force generated by the spring 52 and less than a maximum force which can be generated by pressurized fluid. The force required to actuate the friction brake assembly 20 to cause the predetermined braking effect is less than the compressive force required to cause crushing action of the crushable body 60. The compressive force required to cause a crushing of crushable body 60 is less than the maximum force that may be applied to the piston 31 and the maximum actuating force that may be applied by the piston to the friction brake assembly 20. The force generated by the applied pressure to actuate the brake is passed to the spring and the spring is compressed until the insulator comes into contact with the pressure plate 21 or until the piston contacts the spring guide. When the piston is sufficiently extended to cause the insulator to engage the pressure plate the braking force is applied through the insulator to the pressure plate (9*a*, FIG. 3). Load 3*b* from the compressed spring acts on the spring guide (3*b*, FIG. 3). This load is limited and depends on the length of the compressed spring and spring stiffness. The spring guide transfers this load to the crushable tube (load 4*b*). If there is a gap between the insulator and the pressure plate (i.e. if, due to wear, the piston stroke is insufficient to bring the insulator into contact with the pressure plate) additional load is applied from the piston. The maximum force 4*b* is the force required to crush the tube. The force is passed from the tube to the locker 34 (5*b*, FIG. 3).

When the actuation of the friction brake assembly 20 is no longer required, the actuating force applied by the working fluid supply on the piston 31 is removed. As such, the biasing force of the spring 52 exceeds the actuating force applied on the piston 31 and the piston 31 is urged to move from its extended stroke position to the retracted stroke position. Such stroke actions may be performed in a plurality of cycles.

As the components of the friction brake assembly wear, such wear is required to be compensated in order to maintain the length of the piston stroke over repeated cycles, and in particular to maintain the release clearance irrespective of the extent of the wear. When such wear occurs, initially the piston 31 will move from its retracted stroke position when pressure is applied and overcomes the biasing force of the spring 52 (2*b*, FIG. 3) to reduce the clearance between the disc 39 and the pressure plate 21. This movement is limited by the action of the piston stroke limiter 70, and abutment against the extension stroke stop 77.

If wear has occurred then the actuating stroke length is greater than the stroke length of the piston stroke limiter 70. When this occurs, the actuating force applied to the piston increases and applies a compressive force on the crushable body 60 above a predetermined crush limit between the piston head and the piston abutting the extension stroke stop 77. When this force exceeds the resistance to crushing of the crushable body 60 (FIG. 4) then the crushable body 60 is caused to crush and so reduce in axial length as a result of the partial deformation of the thin walled structure 61 until the required engagement provided by disc 39 with the friction brake assembly 20 to cause the braking action. At this point, axial movement of the piston 31 is prevented due to the reaction force of the friction brake assembly 20. In this state, the spring is compressed and acts on the piston (force 2*a*, FIG. 4)) to retain the piston in the housing and the force is also acting on the spring guide on the other side (force 2*b*) and is passed from the spring guide to crush the crushable tube 60 (force 3). The load 3 to crush the tube 60 is the sum of the load 1 from the pressure applied to the piston force 1), the load 2*b* applied through the spring guide, minus the load 2*a* acting to retain the piston.

In the crushed state, the crushable tube 60 transfers the whole load 3 to the locker (load 4).

Upon release of the actuating force on the piston 31, then the biasing force of the spring 52 exceeds the actuating force and urges the piston stroke limiter 70, the crushable body 60 and piston 31 away from the extended stroke position, into the retracted stroke position. As the crushable body 60 is non-resilient, then the reduced axial length of the crushable body 60 is maintained. As such, the release clearance is defined by the movement of the piston from contact with the extension stroke stop 77 to contact with the retraction stroke stop 76. As such, the release clearance in the retracted stroke positon is maintained. The adjustment gap corresponds to the release clearance.

Upon continued operating cycles of the piston assembly 30, and therefore the brake system 10, wear of the discs of the friction brake assembly 20 continues. Upon each cycle, the compression of the crushable body 60 in the axial direction, and therefore the reduction in the axial length of the crushable body 60 corresponds to the wear of the friction brake assembly 20. The prescribed clearance is reestablished upon return of the piston assembly 30 to the retracted stroke position. Such continued wear causes the piston 31 to telescope from the housing 32 relative to adjuster assembly 50 and the piston stroke limiter 70 in which the release clearance is maintained in the retracted stroke position, and the disc 39 engages with the friction brake assembly 20 in the extended stroke position.

Figure 5A:
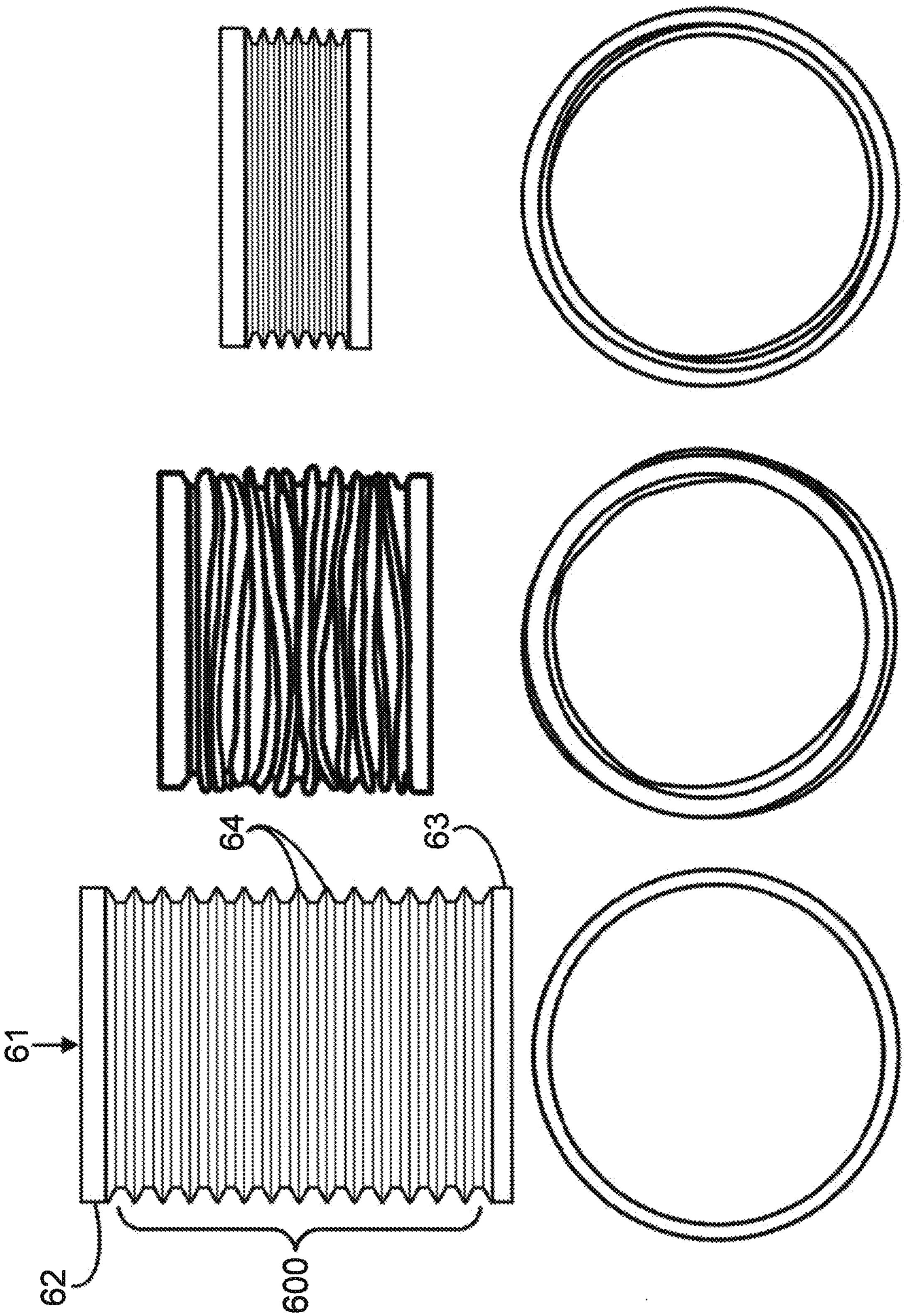
FIG. 5A is a perspective schematic view of a crushable tube of an adjuster assembly according to the disclosure.
Figure 5B:
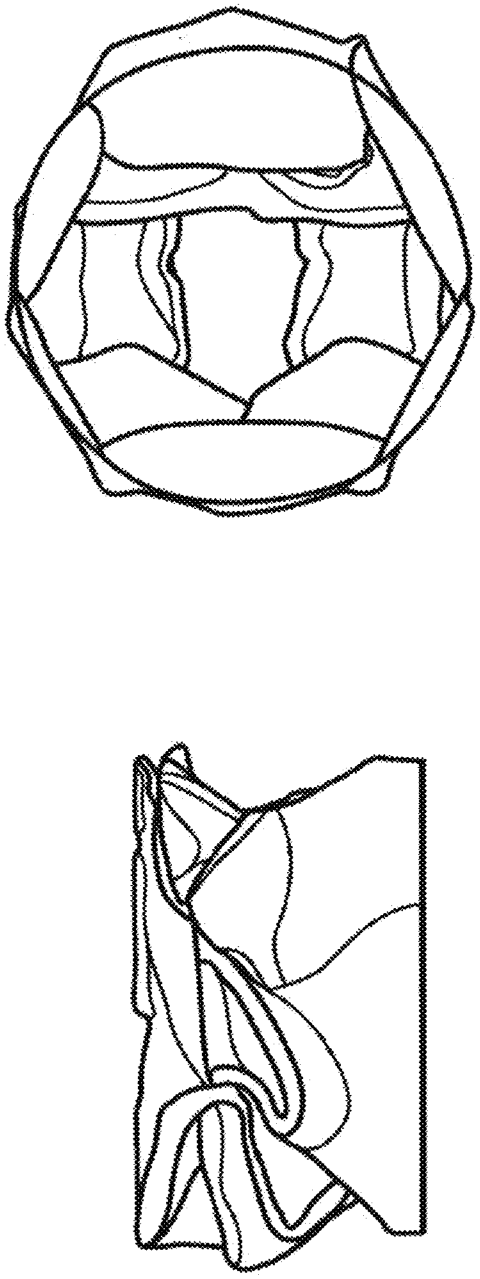
FIG. 5B shows the shape of a non-corrugated tube, when crushed, for comparison.

The crushable body 60, best seen in different degrees of being crushed in FIG. 5A, comprises a corrugated crushable body portion 600 defined between two end portions 62, 63. The corrugated crushable body portion 600 has a regular corrugated form along its axial length. The end portions 62, 63 are formed with flat (non-corrugated) sections. These flat ends allow for correct tube positioning to prevent lateral movement and to avoid force decrease at the start of crushing. The geometry of the end portions 62, 63 is different from that of the corrugated crushable body portion 600, and this flat geometry controls the initial load performance at the start of crushing, to avoid load spikes. As the crushable body 60 is crushed and therefore reduces in its axial length the force required to crush the crushable body 60 is stable over the crushable length and therefore the force required to maintain the release clearance is stable. The corrugated structure has been found to result into a crushed form which has a substantially regular inner and outer diameter as the peaks and troughs of the corrugations essentially cancel each other out when crushed. With the arrangement of the crushable body 60, the stroke length possible is maximized within the same envelope of the housing. The ratio of maximum adjustment length to physical assembly length is maximised. The tube diameter, depths of corrugations, lengths of flat ends, wall thickness, corrugation length and tube length can all be varied as required and will affect the force paths described above. In a preferred example, that has been found to provide particularly good crush characteristics, the ratio of the corrugation depth to external tube diameter is between 0.01 and 0.3, the ratio of corrugation depth to corrugation length (in the axial direction) is between 0.1 and 1.85; the ratio of wall thickness to external tube diameter is between 0.001 and 0.2 and the ratio of the sum of the length of the flat end portions to the overall tube length is between 0.001 and 1. The resulting, regular shape of the crushed tube can be compared with the irregular shape of a non-corrugated tube when crushed as seen in FIG. 5B.

Figure 6A:
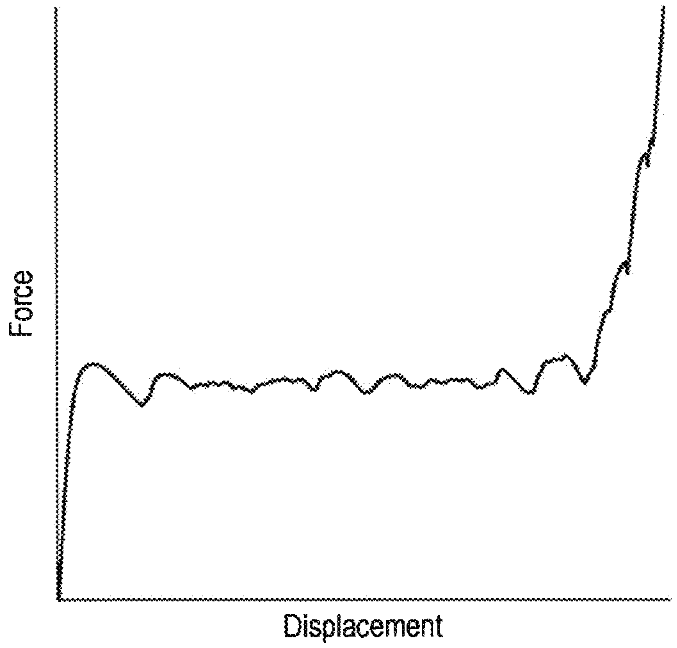
FIG. 6A shows a plot of load vs. crushed length for an example non-corrugated tube.
Figure 6B:
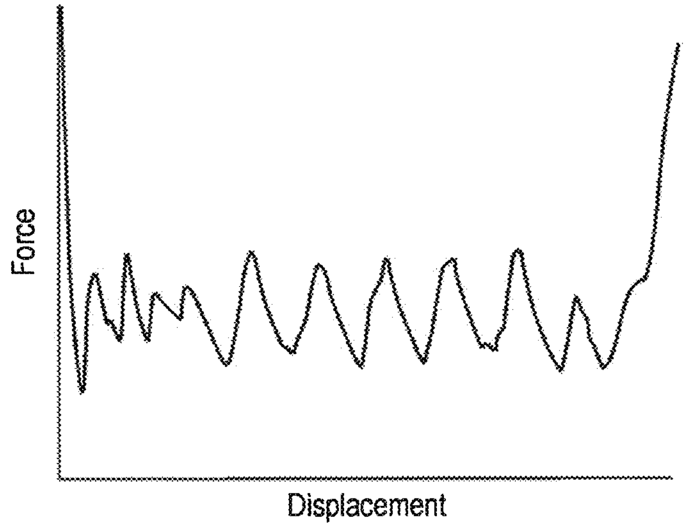
FIG. 6B shows a plot of load vs. crushed length for an example corrugated tube according to the disclosure.

The behavior of the corrugated crushable tube of this disclosure can be compared to that of a non-corrugated tube by viewing the load vs. axial length plots of FIGS. 6A and 6B. With a smooth (non-corrugated) tube, as seen in FIG. 6A, there is a high peak force at the time the tube starts to be crushed and the force oscillates during crushing. In contrast, with a corrugated tube according to the disclosure, the flat end portions 62, 63 ensure that there is a gradual increase in force at the start of crushing and then the force remains very stable during the crushing of the corrugated crushable body portion 600. Without the flat end portions 62, 63, there may be uneven drops in force at the initial phase of crushing, but after this initial phase, the force will also remain very stable during the crushing of the corrugated crushable body portion 600.

The fully crushed crushable body 60 prevents under adjustment of fully worn brakes. The adjustment force increases in the event of over-adjustment of the system. To replace the fully crushed crushable body 60, the disc 39, locker 34, spring guide 53 and used crushable body 60 are all removed from the same end of the piston assembly 30 without the need to remove the piston 31 from the housing 32. As such, ease of maintenance of the piston assembly 30 is maximized. The number of parts of the system is minimized.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the claims. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A crushable body for use in a position adjustment assembly, the crushable body comprising:

a thin-walled tube comprising a corrugated crushable body portion and two flat end portions, the corrugated crushable body portion formed with corrugations along its entire length between the two flat end portions, the corrugated crushable body portion configured to form a crushed body of reduced axial length compared to an axial length of the thin-walled tube when a predetermined force is applied to the thin-walled tube, wherein a first of the two flat end portions is positioned adjacent and in contact with a piston head positioned within a piston housing and wherein a second of the two flat end portions is positioned adjacent to and in contact with a locker, the locker secured to an open end of the piston housing to close an end of the piston housing, wherein the locker is a one-piece rigid component;

wherein the corrugations have a corrugation depth in a radial direction and a corrugation length in an axial direction, wherein the thin-walled tube has an external tube diameter, an internal tube diameter, a wall thickness, and an initial axial length, wherein the two flat end portions have an axial length, and wherein the wall thickness of the corrugated crushable body portion is between 0.1 mm-0.5 mm (0.004-0.02 inch).

2. The crushable body of claim 1, wherein at least one of:

a ratio of the corrugation depth to the external tube diameter is in a first range of 0.01 to 0.3, a ratio of the corrugation depth to the corrugation length is in a second range of 0.1 to 1.85, a ratio of the wall thickness to the external tube diameter is in a third range of 0.001 and 0.2, or a ratio of a sum of the length of the two flat end portions to the initial axial length is in a fourth range of 0.001 and 1.

3. A piston assembly for engaging two selectively engageable parts comprising:

a housing defining a piston cylinder;

a piston; and an adjuster assembly comprising:

a piston stroke limiter configured to limit the length of a return stroke of the piston from an extended stroke position and a retracted stroke position, the piston stroke limiter comprising a spring and a spring guide; and the crushable body as claimed in claim 1, acting between the piston and the piston stroke limiter, the crushable body being arranged to reduce in axial length when a length of an extension stroke exceeds a length of a retraction stroke to maintain the length of the return stroke.

4. The piston assembly of claim 3, wherein the crushable body is radially outwards of the piston and the piston stroke limiter.

5. The piston assembly of claim 3, wherein the crushable body is a sleeve surrounding at least part of the piston.

6. The piston assembly of claim 3, wherein the crushable body is in the piston cylinder.

7. The piston assembly of claim 3, the spring guide defining an extension stroke stop and a retraction stroke stop.

8. A brake system for an aircraft comprising the piston assembly of claim 3.

9. An adjuster assembly for maintaining a release clearance between selectively engageable parts to compensate for wear in the parts, the adjuster assembly comprising:

a spring and a spring guide configured to limit the length of a stroke of an extendable member between an extended stroke position and a retracted stroke position; and the crushable body as claimed in claim 1, configured to be at least partially crushed to reduce the axial length of the crushable body in response to an extension stroke movement due to wear of the parts exceeding a retraction stroke movement.

10. A brake system for an aircraft comprising the adjuster assembly of claim 9.

11. A method of operating a brake assembly comprising:

moving a piston to bring opposing brake components into frictional engagement, and controlling the stroke of the piston using the adjuster assembly as claimed in claim 9.

12. A method of assembling a piston assembly comprising:

receiving a piston in a piston cylinder of a housing through a first side of the housing in a first direction;

receiving an adjuster assembly comprising the crushable body as claimed in claim 1, on the piston in the first direction; and enclosing the piston cylinder at the first side.

* * * * *